US008744401B2

(12) United States Patent
Peterson

(10) Patent No.: US 8,744,401 B2
(45) Date of Patent: Jun. 3, 2014

(54) ENHANCED TELEMATIC EMERGENCY RESPONSE

(75) Inventor: Don Peterson, Belvidere, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 145 days.

(21) Appl. No.: 13/112,209

(22) Filed: May 20, 2011

(65) Prior Publication Data

US 2012/0295576 A1 Nov. 22, 2012

(51) Int. Cl.
*H04M 11/04* (2006.01)

(52) U.S. Cl.
USPC .................... 455/404.2; 455/456.1; 455/466; 455/418; 455/445; 455/426.1; 379/49; 379/142.1; 379/207.12; 340/293; 340/307; 701/23; 701/45; 701/31.5; 370/328

(58) Field of Classification Search
USPC ................ 455/404.1, 404.2, 414.1, 415, 418, 455/422.1, 445, 426.1, 456.1, 466; 340/471, 425.5, 287–309; 370/328–338; 379/37–51, 142.1, 379/207.12; 701/23, 45, 31.5
See application file for complete search history.

(56) References Cited

U.S. PATENT DOCUMENTS

| | | | | |
|---|---|---|---|---|
| 5,969,598 | A * | 10/1999 | Kimura | 340/436 |
| 6,493,629 | B1 * | 12/2002 | Van Bosch | 701/515 |
| 6,591,176 | B1 | 7/2003 | Perry et al. | |
| 7,050,897 | B2 | 5/2006 | Breed et al. | |
| 7,289,786 | B2 * | 10/2007 | Krasner | 455/404.2 |
| 8,112,061 | B2 * | 2/2012 | Bolin | 455/404.2 |
| 2003/0193930 | A1 * | 10/2003 | Wotherspoon et al. | 370/352 |
| 2004/0142678 | A1 | 7/2004 | Krasner | |
| 2006/0155466 | A1 * | 7/2006 | Kanda et al. | 701/209 |
| 2007/0046457 | A1 * | 3/2007 | Suzuki et al. | 340/539.1 |
| 2007/0201645 | A1 * | 8/2007 | Gass et al. | 379/142.1 |
| 2007/0287409 | A1 | 12/2007 | Hwang | |
| 2009/0099732 | A1 | 4/2009 | Pisz | |
| 2010/0173667 | A1 * | 7/2010 | Hui et al. | 455/552.1 |
| 2012/0146766 | A1 * | 6/2012 | Geisler et al. | 340/8.1 |
| 2012/0214550 | A1 * | 8/2012 | Galaro et al. | 455/561 |

FOREIGN PATENT DOCUMENTS

| | | | |
|---|---|---|---|
| DE | 4227337 | A1 | 2/1994 |
| DE | 102008023281 | A1 | 12/2008 |
| EP | 2273469 | A1 | 1/2011 |

OTHER PUBLICATIONS

International Search Report and Written Opinion dated Jul. 10, 2012, from corresponding International Patent Application No. PCT/US2012/031936.

* cited by examiner

*Primary Examiner* — Anthony S. Addy

(57) ABSTRACT

An enhanced emergency notification system comprising a vehicle location device located in a vehicle, an emergency notification device located in the vehicle, a receiving/transmitting device, and an emergency responder receiving device. The vehicle location device is configured to provide data regarding a current location of the vehicle. The emergency notification device is configured to send a first signal upon a specified event, wherein the first signal includes information on the location of the vehicle obtained from the vehicle location device. The receiving/transmitting device is configured to directly receive the first signal from the emergency notification device and transmit a second signal within a range, wherein the second signal includes at least the same information as the first signal. The emergency responder receiving device is configured to directly receive the second signal from the receiving/transmitting device when within the range.

15 Claims, 2 Drawing Sheets

ENHANCED TELEMATIC EMERGENCY RESPONSE

TECHNICAL FIELD

The invention relates generally to apparatus and methods for relaying vehicle information to emergency responders.

BACKGROUND

Vehicle telematics is generally known as technology that integrates use of telecommunications and information processing within a vehicle. One practical application of vehicle telematics is the use of automatic emergency notification in the event of an emergency incident. For example, when an emergency incident occurs, the vehicle telematics technology will recognize that a predefined criteria has occurred, such as an airbag deployment, and immediately send a telecommunications signal to a remote facility. The remote facility, such as a call center, will process the information received from the vehicle telematics and alert the appropriate authorities, such as the police dispatch center, emergency medical services (EMS) dispatch center, and/or fire house dispatch center. The appropriate authorities will then direct the emergency responders, such as police, firefighters, and/or EMS, to the vehicle which sent the emergency notification.

The emergency notification process as described above, however, has a cycle time from when the vehicle telematics sends the emergency signal to when emergency responders in the field are informed about the emergency situation. As a result, emergency responders located within a short proximity to emergency situation but unaware of the distressed vehicle will not respond until the notification cycle is complete. It may be advantageous to have emergency responders arrive more quickly to the location of the emergency situation by reducing or eliminating this cycle time. By arriving sooner, the emergency responders may be able to more effectively assess and react to the pending emergency situation.

Therefore, it may be desirable for the distressed vehicle to be configured to send an enhanced emergency distress signal that may inform emergency responders located in proximity to the emergency situation without the need for the signal to be processed by a remote facility, such as a call center.

SUMMARY

In an embodiment, a vehicle emergency notification system comprises an emergency notification device located in a vehicle, a receiving/transmitting device, and an emergency responder receiving device. The emergency notification device is configured to send a first signal upon a specified event. The first signal will have data embedded in the signal containing at least information on a location of the vehicle. The receiving/transmitting device is configured to receive the first signal from the emergency notification device and transmit a second signal within a range. The second signal will have data embedded in the second signal containing at least the same information as the first signal. The emergency responder receiving device is configured to directly receive the second signal transmitted from the receiving/transmitting device when the emergency responder receiving device is within the range.

In an embodiment, a method of emergency notification comprises activating the emergency notification device in a vehicle upon an event, determining if a first signal should be transmitted, transmitting the first signal from the emergency notification device which includes at least information regarding the location of the distressed vehicle, receiving the first signal from the emergency notification device by the receiving/transmitting device, transmitting the second signal from the receiving/transmitting device within a range, receiving the second signal sent from the receiving/transmitting device by the emergency responder receiving device when within the range, determining if the data from the second signal should be displayed on the emergency responder receiving device, and displaying an emergency notification on the emergency responder receiving device including at least the information regarding the location of the vehicle.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
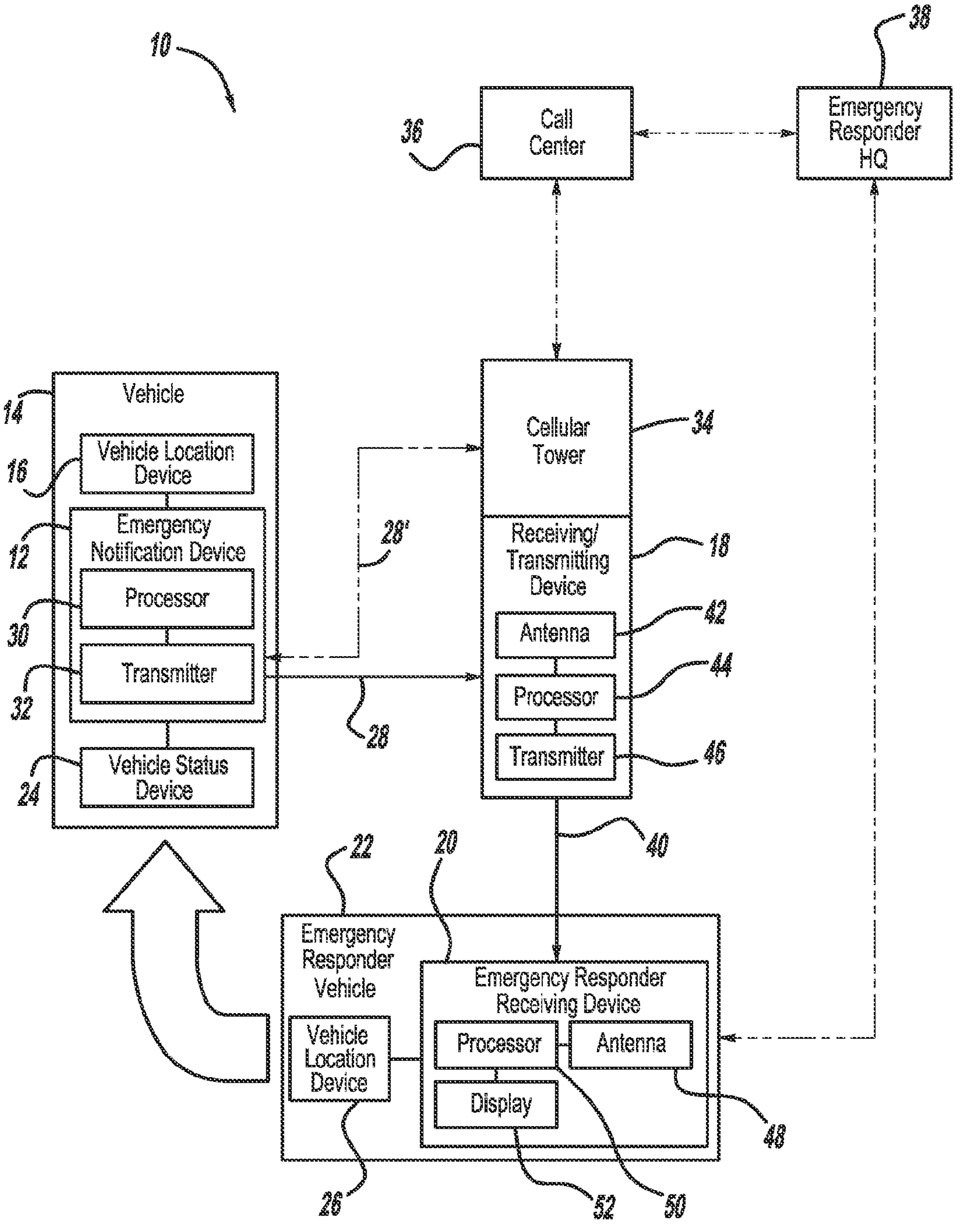
FIG. 1 is a block diagram of an embodiment of an enhanced emergency notification system.

FIG. 1 represents a block diagram of an embodiment of an enhanced emergency notification system 10. The enhanced emergency notification system 10 may comprise an emergency notification device 12 located in a vehicle 14, a first vehicle location device 16 located in the vehicle 14, a receiving/transmitting device 18, and an emergency responder receiving device 20 located in an emergency responder vehicle 22. Additionally, the enhanced emergency notification system 10 may also include a vehicle status device 24 located in the vehicle 14 and/or a second vehicle location device 26 located in the emergency responder vehicle 22.

The emergency notification device 12 is an apparatus configured to receive input data, process the input data to determine if a specified event has occurred, and automatically transmit a first signal 28 if the specified event has occurred. The emergency notification device 12 may be connected to the first vehicle location device 16 and the vehicle status device 24.

The emergency notification device 12 may include a first processor 30 and a first transmitter 32. The first processor 30 may comprise any type of processor or multiple processors, a microprocessor known as a single integrated circuit, a plurality of integrated circuits, and/or any suitable number of integrated circuits working in cooperation to accomplish the functions of the first processor 30 as known to those with skill in the art. The first processor 30 may receive the input data, run a set of instructions utilizing the data, and generate an output in the form of a determination regarding whether the first signal 28 should be broadcast via the first transmitter 32. Circuitry for accomplishing the functions of the first processor 30 and/or implementing the instructions in a control algorithm can be readily provided by those having ordinary skill in the art after becoming familiar with the teachings herein. The emergency notification device 12 may utilize the first processor 30 to determine whether the specified event has occurred based on the input data. The specified event may be any event where occupants in the vehicle 14 may require assistance from emergency responders or roadside assistance. Some examples of the specified event may include a vehicle collision, an airbag deployment, loss of source of propulsion energy (such as no fuel and/or no power), substantial loss of tire pressure (such as a flat tire), and/or other events known by those with skill in the art.

The emergency notification device 12 may receive input data from various pre-existing devices in the vehicle 14, such as airbag crash sensors, fuel sensors, tire pressure sensors, or other pre-existing devices known to those of skill in the art. In some embodiments, the enhanced emergency notification system 10 may include a vehicle status device 24. When the enhanced emergency notification system 10 includes the vehicle status device 24, the emergency notification device 12 may be connected to the vehicle status device 24 and may receive data about the status of the vehicle 14 from the vehicle status device 24. The vehicle status device 24 is an apparatus configured to obtain data regarding the status of the vehicle 14 and may send that data to the emergency notification device 12. The vehicle status device 24 may be integrated with any pre-existing device that obtains the status of the vehicle 14 as known to those of skill in the art. The vehicle status device 24 may also be a separate component configured to receive data from any pre-existing devices that are configured to output data regarding the status of the vehicle 14.

The first transmitter 32 may be an apparatus that can generate a wireless radio-frequency signal and broadcast it over a specific area as known to those of skill in the art. The emergency notification device 12 may utilize the first transmitter 32 to send the first signal 28. The emergency notification device 12 may be integrated with a telematic system in the vehicle 14 or may have a dedicated transmitting apparatus. When integrated with the telematic system, the emergency notification device 12 may utilize the telecommunication capabilities of the telematic system to transmit the first signal 28. For example, the telecommunication capabilities of the telematic system may utilize a cellular phone which is wirelessly linked to the telematic system, or the telematic system may have a dedicated cellular line independent of any linked cellular phones. If the emergency notification device 12 utilizes a dedicated transmitter, the dedicated transmitter may be configured to transmit the first signal 28 as a wireless radio-frequency signal, including, but not limited to the cellular band of the radio-frequency bandwidth.

The first signal 28 sent from the emergency notification device 12 may be omnidirectional. The first signal 28 sent from the emergency notification device 12 may be encoded with data regarding the current status of the vehicle 14. For example, the first signal 28 may be encoded with data that the vehicle 14 is in distress. Additionally, more data may be encoded in the first signal 28 as the emergency notification device 12 receives additional input data regarding the status of the vehicle 14. For example, the emergency notification device 12 may encode the first signal 28 with a plurality of data including, but not limited to, airbag deployment status, a tire(s) substantial loss of pressure, vehicle collision data (such as the speed of the vehicle 14 prior to substantial deceleration of the vehicle 14), lack of fuel, and/or any data regarding the status of a vehicle 14 relevant to an emergency responder.

The enhanced emergency notification system 10 may include the vehicle location device 16. The first vehicle location device 16 is an apparatus that is configured to obtain data regarding the current location of the vehicle 14. For example, when the first vehicle location device 16 is included in the vehicle 14, the first vehicle location device 16 will obtain data regarding the current vehicle location of the vehicle 14. In an embodiment, the first vehicle location device 16 may comprise an antenna configured to receive global positioning satellite ("GPS") signals. The first vehicle location device 16 may also have a map database where the GPS data may be used to obtain the location on a map. The first vehicle location device 16 may be integrated with a pre-existing device, such as a navigational system in the vehicle 14. Using the data obtained from the first vehicle location device 16, the first signal 28 sent from the emergency notification device 12 may be encoded with data regarding the current location of the vehicle 14, and therefore, the location where the vehicle 14 is in distress. In an embodiment, the first signal 28 may be a text message encoded with the data received from the plurality of inputs from the distressed vehicle 14.

When the vehicle 14 becomes distressed, the emergency notification system 10 may send both an enhanced emergency notification and a standard emergency notification. When the emergency notification device 12 has been activated to send the first signal 28 configured to be received by the receiving/transmitting device 18, the emergency notification device 12 may configure the first signal 28' to be additionally received by the cellular tower 34. In other words, the first signal 28, 28' may be received by both the receiving/transmitting device 18 and the cellular tower 34. The first signal 28 received by the receiving/transmitting device may be used for an enhanced emergency notification to notify emergency responders in emergency responder vehicles 22 that are currently located within a predefined range of the distressed vehicle 14 without the need to contact a call center 36. In addition to the enhanced emergency notification, the first signal 28' received by the cellular tower 34 may be used for a standard emergency notification. The emergency notification device 12 may send the first signal 28 to both the receiving/transmitting device 18 and the cellular tower 34 simultaneously or consecutively. An exemplary embodiment of the standard emergency notification may include communication between the emergency notification device 12, the cellular tower 34, the call center 36, an emergency responder headquarters 38, and the emergency responder in the emergency responder vehicle 22. For example, when the cellular tower 34 receives the first signal 28', the cellular tower 34 may send the data encoded in the first signal 28' to a call center 36. The call center 36 may then communicate with an emergency responder headquarters 38, such as a police station, a fire department, an EMS station, and/or other emergency responder headquarters 38 known to those of skill in the art. The emergency responder headquarters 38 may then communicate with emergency responders in emergency responder vehicles 22 and provide the emergency responders with the information necessary to respond to the location of the vehicle 14 containing the emergency notification device 12 which sent the first signal 28.

The receiving/transmitting device 18 is an apparatus configured to receive the first signal 28 sent from the emergency notification device 12 and automatically transmit a second signal 40 after receiving the first signal 28. The receiving/transmitting device 18 may include a first antenna 42, a second processor 44, and a second transmitter 46. The first antenna 42 is an apparatus configured to receive radio-frequency signals as known to those of skill in the art. In an embodiment, the first antenna 42 may be configured to directly receive the first signal 28 sent from the emergency notification device 12. In an embodiment, the receiving/transmitting device 18 may be integrated with the cellular tower 34. When integrated with the cellular tower 34, the receiving/transmitting device 18 may utilize the existing receiving and/or transmitting antenna of the cellular tower 34 to obtain the first signal 28 transmitted from the emergency notification device 12. After receiving the first signal 28, the first antenna 42 may send the data encoded in the first signal 28 to the second processor 44.

The second processor 44 of the receiving/transmitting device 18 may receive data from the first antenna 42. The second processor 44 may be a similar apparatus for processing as described for the first processor 30 and/or as known to those of skill in the art. The second processor 44 may use the data about the distressed vehicle 14 to generate an output in the form of a determination regarding how to transmit the second signal 40. For example, the second processor 44 of the receiving/transmitting device 18 may compare the location of the distressed vehicle 14 to the location of the receiving/transmitting device 18. The second processor 44 may then use the compared location data to generate an output in the form of a determination regarding how to provide assistance for the distressed vehicle 14. In an embodiment, the second processor 44 may generate an output to transmit the second signal 40 in a direction closest to the distressed vehicle 14. In another embodiment, the second processor 44 may decide to transmit the second signal 40 omnidirectionally within a limited range. The limit of the range may depend on the emergency response resources available in a particular region. For example, a rural setting may have a limited amount of emergency response resources for a large region. The range of the second signal 40 sent from the receiving/transmitting device 18 may therefore need to be relatively large to be able to reach the emergency responders. Alternatively, in an urban setting, the amount of emergency response resources may be larger and cover a smaller region. Therefore, the range of the second signal 40 in this case may be smaller relative to the rural setting example because of the likelihood that more emergency responders may receive the second signal 40. After determining the range and direction of the broadcast of the second signal 40, the second processor 44 may output data to the second transmitter 46 of the receiving/transmitting device 18. The data encoded in the second signal 40 may include the same data from the first signal 28.

The receiving/transmitting device 18 may utilize the second transmitter 46 to send the second signal 40. The second transmitter 46 may be a similar apparatus for broadcasting radio-frequency signals as described for the first transmitter 32. When the receiving/transmitting device 18 is integrated with the cellular tower 34, the second signal 40 may be sent by the transmitting component of the cellular tower 34. The second transmitter 46 of the receiving/transmitting device 18 may broadcast the second signal 40 within a limited range omnidirectionally or directionally to the selected range determined by the second processor 44 using apparatus and methods as known to those with skill in the art.

In an embodiment, there may be a plurality of receiving/transmitting devices 18 located in different regions. For example, each of the receiving/transmitting device 18 of the plurality of receiving/transmitting devices 18 may receive the same first signal 28 sent by the first transmitter 32 of the emergency notification device 12. Each of the plurality of receiving/transmitting devices 18 may be located on a separate cellular tower 34.

In an embodiment, the receiving/transmitting device 18 may have a standby mode and an active mode where the standby mode consumes less power relative to the active mode. For example, the standby mode may supply only enough power such that the first antenna 42 of the receiving/transmitting device 18 may receive the first signal 28. When the receiving/transmitting device 18 receives the first signal 28 sent from the emergency notification device 12, the receiving/transmitting device 18 may enter the active mode. In the active mode, the second processor 44 and the second transmitter 46 may be supplied power, and the second transmitter 46 may send the second signal 40.

The emergency responder receiving device 20 is an apparatus configured to directly receive the second signal 40 sent from the receiving/transmitting device 18 and may automatically provide an alert message, such as an emergency notification. Upon receiving the alert message and any pertinent data, the emergency responder may proceed to the location of the distressed vehicle 14 equipped with the emergency notification device 12 which had sent the first signal 28. The emergency responder receiving device 20 may be located in the emergency responder vehicle 22.

The emergency notification system 10 may include a second vehicle location device 26 located in the emergency responder vehicle 22. When the second vehicle location device 26 is included in the emergency responder vehicle 22, the second vehicle location device 26 will obtain data regarding the current location of the emergency responder vehicle 22. The emergency responder receiving device 20 may be connected to the second vehicle location device 26 which may provide data regarding the current location of the emergency responder vehicle 22. In an embodiment, the second vehicle location device 26 may comprise an antenna configured to receive global positioning satellite ("GPS") signals. The second vehicle location device 26 may also have a map database where the GPS data may be used to obtain the location on a map. The second vehicle location device 26 may be integrated with a pre-existing device, such as a navigational system in the vehicle 22.

The emergency responder receiving device 20 may comprise a second antenna 48, a third processor 50, and a display 52. The second antenna 48 of the emergency responder receiving device 20 may receive the second signal 40 and send the data encoded in the second signal 40 to the third processor 50. The second antenna 48 is an apparatus configured to receive radio-frequency signals as known to those of skill in the art. In an embodiment, the second antenna 48 may be configured to receive radio-frequency signals in the cellular band.

The third processor 50 of the emergency responder receiving device 20 may use the data received from the second antenna 48 and send the data to the display 52 for viewing and/or alerting purposes. For example, the emergency responder receiving device 20 may receive the second signal 40 and show on the display 52 the data encoded in the second signal 40, such as the location of the vehicle 14, whether an airbag had deployed, whether a tire(s) lost pressure, speed of the vehicle 14 prior to a collision, miscellaneous crash data, lack of fuel, and/or any data regarding the status of a vehicle 14. The third processor 50 may also be programmed to selectively provide the data obtained from the second signal 40 based on predefined criteria, such as location and/or type of emergency. An example of a predefined location criteria may include comparing the location of the emergency responder vehicle 22 relative to the location of the distressed vehicle 14. If the distance between the emergency responder and the distressed vehicle 14 is within the predefined criteria, then the emergency responder receiving device 20 may provide the data on the display 52 to alert the emergency responder. Using data from the second vehicle location device 26 located in the emergency responder vehicle 22, the emergency responder receiving device 20 may suggest and display a route that will guide the emergency responder to the location of the distressed vehicle 14.

Additionally, the emergency responder receiving device 20 may be programmed to selectively display only certain types of emergencies depending on the type of emergency responder vehicle 22 equipped with the emergency responder receiving device 20. For example, various types of emergency responder vehicles 22 may be equipped with the emergency responder receiving device 20, including, but not limited to, police vehicles, fire trucks/vehicles, EMS vehicles, and road-side assistance vehicles. Certain types of emergencies for distressed vehicles 14 may be more pertinent to certain types of emergency responders. A road-side assistance emergency responder may be more suitable to respond to the distressed vehicle 14 with a flat tire, lack of fuel, and other "low-priority" emergency situations. Police, fire, and/or EMS may be more suitable to respond to higher priority emergency situations, including, but not limited to a vehicle accident which may or may not include an airbag deployment. It should be noted that numerous criteria and vehicle emergency situations may exist as known to those of skill in the art, and the emergency responder receiving device 20 may be programmed accordingly.

The display 52 of the emergency responder receiving device 20 may be integrated with a pre-existing display in the emergency responder vehicle 22 or may be a dedicated display for the emergency responder receiving device 20. The display 52 may be an LCD screen or other display screen as known by those with skill in the art. The display 52 may be capable of visually or audibly providing the data received from the second signal 40 and providing a suggested route on a map to proceed to the location of the distressed vehicle 14.

Figure 2:
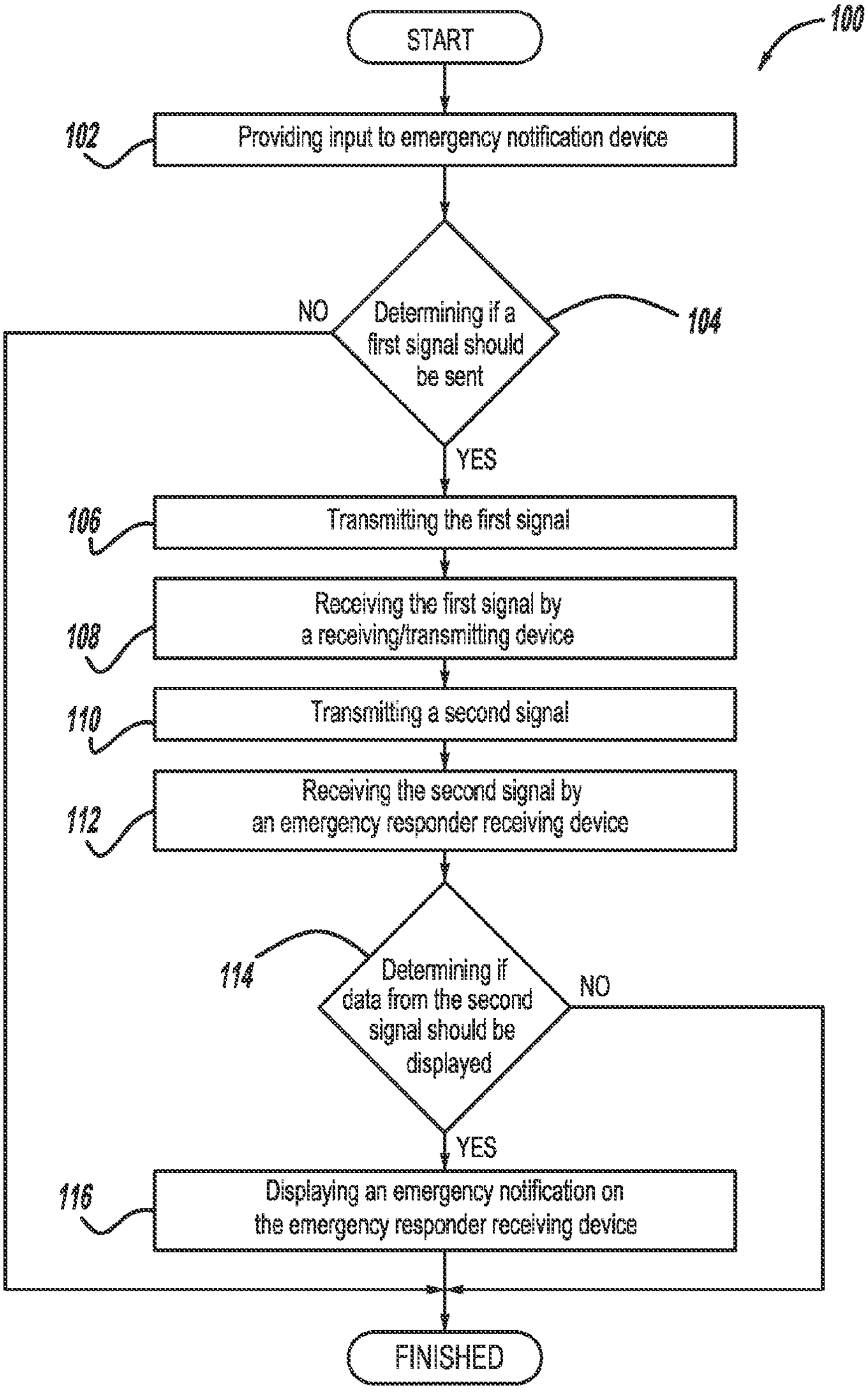
FIG. 2 is a flowchart generally illustrating the steps of an enhanced emergency notification method using the apparatus illustrated in FIG. 1.

FIG. 2 generally illustrates an embodiment of an enhanced emergency notification method. The enhanced emergency notification method 100 may utilize an enhanced emergency notification system 10 that comprises at least the emergency notification device 12 located in the vehicle 14, the receiving/transmitting device 18, and the emergency responder receiving device 20.

The enhanced emergency notification method may begin at step 102 when the vehicle 14 becomes distressed. The emergency notification device 12 may be activated when the emergency notification device 12 receives input data from other components in the vehicle 14. The input data may include status information relevant to the distress of the vehicle 14, such as, but not limited to, an airbag deployment in the vehicle 14.

In step 104, the emergency notification device 12 determines whether the inputted data has met a predefined criteria. If no, then the first processor 30 of the emergency notification device 12 generates an output that no first signal 28 is needed and the enhanced emergency notification method 100 may be complete. If yes, then in step 106, the emergency notification device 12 may transmit a first signal 28 encoded with data containing at least the location of the vehicle 14 in distress. The first signal 28 may also be encoded with other data received by the emergency notification device 12 from other components in the vehicle 14, such as, but not limited to the vehicle status device 24.

In step 108, the receiving/transmitting device 18 may receive the first signal 28 sent by the emergency notification device 12. In an embodiment when the emergency notification system will additionally send the standard emergency notification, the cellular tower 34 may receive the first signal 28' when the first signal 28, 28' is configured to be received by both the receiving/transmitting device 18 and the cellular tower 34. After receiving the first signal 28', the cellular tower 34 may then send the data encoded in the first signal 28' to the call center 36 to proceed with the standard emergency notification process as known to those with skill in the art.

In step 110, the receiving/transmitting device 18 may transmit a second signal 40 encoded with the same data that was encoded in the first signal 28. The receiving/transmitting device 18 may send the second signal 40 omnidirectionally. Alternatively, in an embodiment where the receiving/transmitting device 18 is configured to broadcast the second signal 40 directionally, the receiving/transmitting device 18 may compare the location of the distressed vehicle 14 from the data encoded in the first signal 28 to the pre-programmed location coordinates of the receiving/transmitting device 18 and broadcast the second signal 40 directionally to an area where emergency responders would be able to quickly respond to the location of the distressed vehicle 14.

In step 112, the second signal 40 may be received by the emergency responder receiving device 20. The emergency responder receiving device 20 may be located in the emergency responder vehicle 22. The second antenna 48 of the emergency responder receiving device 20 may receive the second signal 40 and input the data encoded in the second signal 40 to the third processor 50 of the emergency responder receiving device 20.

In step 114, the third processor 52 of the emergency responder receiving device 20 may generate an output in the form of a determination regarding whether to show the data received from the second signal 40 on the display 52. For example, the third processor 50 of the emergency responder receiving device 20 may use a location criteria or a type of emergency responder criteria as described earlier. If the criteria is met, then the enhanced emergency notification method 100 may show the emergency notification described in step 116 on the display 52. If the criteria is not met, then the enhanced emergency notification method 100 may skip step 116.

In step 116, the emergency responder receiving device 20 may show the data received from the second signal 40 on the display 52. The emergency responder receiving device 20 may also provide an audio alert. The emergency responder receiving device 20 may show the location of the distressed vehicle 14, the type of emergency, and any other data received from the second signal 40 on the display 52. The emergency responder receiving device 20 may also show a suggested route from the current location of the emergency responder vehicle 22 to the location of the distressed vehicle 14 on the display 52. After receiving the enhanced emergency notification, the emergency responder may be able to proceed to the location of the distressed vehicle 14 without having to be notified of the distressed vehicle 14 from the respective emergency responder headquarters 38, thereby reducing the notification cycle time.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. An emergency notification system for a vehicle, the system comprising:

a vehicle location device located in the vehicle, wherein the vehicle location device is configured to provide data regarding the current location of the vehicle;

an emergency notification device located in the vehicle, wherein: the emergency notification device is configured to receive input data regarding the vehicle, process the input data to determine if a specified emergency event has occurred, and upon the determination that the specified even has occurred, transmit substantially at the same time a first and a second type of emergency notification signals, which contain at least the current location data provided by the vehicle location device, to a cellular base station comprising a transceiver configured to relay the second type of signal to an emergency call center upon receipt of the second type of signal, the base station further includes an emergency receiving/transmitting device configured to: receive the first type of emergency notification signal, compare the current location data of the vehicle to the predetermined location of the base station; upon determining the current location data of the vehicle meets a location criteria with respect to the location of the base station, transmit a third type of signal including at least the same data that was in the first type of signal directionally to at least a remote emergency responder receiving device;

the system further comprises an emergency responder receiving device configured to receive the third type signal from the transmitting/receiving device, wherein the emergency responder device is located in an emergency responder vehicle and comprises a display that is configured to visually show at least some of the data obtained from the received third type signal; and a second vehicle locating device located in the emergency responder vehicle;

wherein the second vehicle locating device is configured to obtain current location data of the emergency responder vehicle to the emergency responder receiving device;

the emergency receiving device is further configured to display the data obtained from the third type of signal on the display only if the emergency responder receiving device determines that the location of the emergency responder vehicle is within a predefined distance to the location of the vehicle having the emergency notification device which sent the first type emergency notification signal.

2. A system according to claim 1, wherein the emergency notification device is integrated with a telematic system of the vehicle.

3. A system according to claim 1, wherein the first type and the second type emergency notification signals are radio-frequency wireless signals.

4. A system according to claim 3, wherein the first and second types of emergency notification signals are radio-frequency signals on a cellular communications system band.

5. A system according to claim 1, wherein the current location of the vehicle is described by coordinates obtained from global positioning satellites.

6. A system according to claim 1, wherein the input data regarding the vehicle comprises data regarding an operational status of the vehicle and wherein the first type emergency notification signal sent from the emergency notification device further includes data regarding the operational status of the vehicle.

7. A system according to claim 6, wherein the data regarding the status of the vehicle includes data that an airbag has deployed in the vehicle.

8. A system according to claim 1, wherein the specified event is an airbag deployment in the vehicle.

9. A system according to claim 1, wherein the emergency notification system comprises a plurality of receiving/transmitting devices and each one of the receiving/transmitting device of the plurality of receiving/transmitting devices is located in a different region.

10. A system according to claim 1, wherein the receiving/transmitting device broadcasts the transmission of the third signal omnidirectionally.

11. A system according to claim 1, wherein the receiving/transmitting device has a standby mode and an active mode, and wherein the standby mode uses less power relative to the active mode and the receiving/transmitting device in the standby mode is configured to switch to the active mode upon receiving the first type emergency notification signal.

12. A system according to claim 1, wherein the display for the emergency responder receiving device is integrated with a pre-existing display in the emergency responder vehicle.

13. A system according to claim 1, further comprising a second vehicle locating device in the emergency responder vehicle, wherein the second vehicle locating device is configured to send data regarding the current location of the emergency responder vehicle to the emergency responder receiving device, and further wherein the display of the emergency responder receiving device displays a suggested navigational route between the emergency responder vehicle and the vehicle having the emergency notification device which sent the first type emergency notification signal.

14. A system according to claim 13, wherein the second vehicle locating device in the emergency responder vehicle is integrated with a pre-existing vehicle navigation device.

15. A method of emergency notification for a vehicle, the method comprising:

providing input data regarding the vehicle to an emergency notification device located in the vehicle;

obtaining current location of the vehicle using a vehicle location device located in the vehicle;

processing input data to determine if a specified event has occurred; transmitting substantially at the same time a first and a second type of emergency notification signals which contain at least current location data provided by the vehicle location device from the emergency notification device, relaying by a cellular base station the second type of signal to an emergency call center upon receipt of the second type of signal;

at a an emergency receiving/transmitting device located on the cellular base station, upon receiving the first type of emergency notification signal, comparing the current location data of the vehicle to the predetermined location data of the base station; upon determining the current location data of the vehicle meets a location criteria with respect to the location of the base station, transmitting a third type of signal including at least the same data that was in the first type of signal directionally to at least a remote emergency responder receiving device;

providing an emergency responder receiving device located in an emergency responder vehicle and configured to receive the third type signal from the transmitting/receiving device, showing via a display of the emergency responder receiving device at least some of the data obtained from the received third type signal; and obtaining, using a second vehicle locating device located in the emergency responder vehicle, current location data of the emergency responder vehicle and providing the obtained location data to the emergency responder receiving device;

displaying on the display of the emergency receiving device the data obtained from the third type of signal on the display only if the emergency responder receiving device determines that the location of the emergency responder vehicle is within a predefined distance to the location of the vehicle having the emergency notification device which sent the first type emergency notification signal.

* * * * *